April 23, 1963
M. P. LAUGHLIN
3,086,322
LAWN EDGER TAPE AND APPLICATOR
Original Filed Sept. 3, 1955
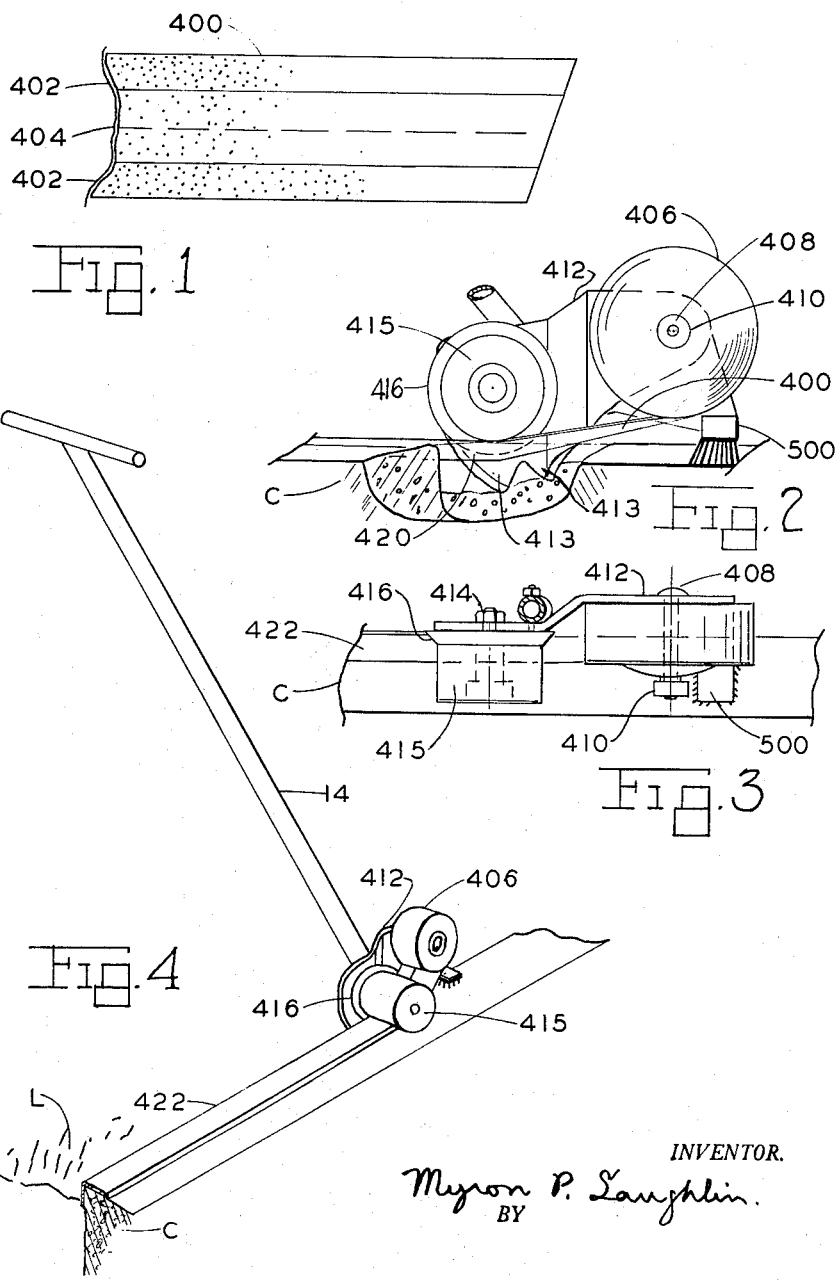
INVENTOR.
Myron P. Laughlin.
BY

United States Patent Office 3,086,322
Patented Apr. 23, 1963

3,086,322
LAWN EDGER TAPE AND APPLICATOR
Myron P. Laughlin, 1705 Beach Drive SE.,
St. Petersburg, Fla.
Original application Sept. 3, 1955, Ser. No. 534,043, now Patent No. 2,951,314, dated Sept. 6, 1960. Divided and this application June 6, 1960, Ser. No. 35,105
9 Claims. (Cl. 47—58)

This invention relates to vegetation demarcation, and more particularly to lawn edging.

It is the purpose of this invention to provide simple, inexpensive means for the making and maintenance of the sharp edge lines desirable for lawn areas.

An object of this invention is to provide low cost means for making, marking and maintaining a lawn edge without the labor and effort formerly involved, and to do this in such embodiment as to be readily used by the average lawn owner without previous experience or particular skill.

It is also an object of this invention to provide means which will incorporate in itself maintenance of the lawn edge for a substantial period without further effort, by the use of suitable control chemicals applied and held in place as a part of the function of such means.

The purpose of this invention includes the provision of a simple device capable of applying the aforesaid means without the user contacting the chemicals employed and while such means are acting to apply such chemical in the correct amounts in the correct locale, this being a division of my application Serial No. 534,043 co-pending, now Patent No. 2,951,314, granted September 6, 1960.

Certain other objects and improvements and advantages will appear as this application proceeds and in a description of the appended drawings in which:

FIG. 1 shows one preferred form of tape or web means.

FIG. 2 shows a side view of a preferred form of applicator.

FIG. 3 shows a top view of the device of FIG. 2.

FIG. 4 shows one application of the devices described.

Referring now more particularly to the figures, a preferred modification of my invention is shown wherein the chemical is contained in and applied through the medium of a tape 400, which may have a paper tape backing on the edges of which are arranged adhesive strips 402 at either side of a central strip 404 coated with chemicals such as growth inhibitors, sterilizers, herbicides, fungicides, edge defining chemicals and the like and including their derivatives.

It will be understood that adhesive sections 402 may also contain other chemicals than adhesive and that the strip itself may be the chemical container, but that the structure shown has advantage in that the chemical is protected from human contact, evenly distributed, and may be merchandised in prepared rolls such as that indicated at 406 in FIG. 2 wherein a roll 406 is mounted on an arbor 408 through such means as a removable hand nut 410. Arbor 408 mounts in a frame piece 412 which also carries an arbor 414 upon which journals a guide and support roller 415 which is preferably provided with a guide flange 416.

Frame 412 serves also to mount turf cutter means such as teeth 413 and when roller 415 runs upon a curb C, or is otherwise guided, these teeth produce a shallow cut at least partially severing the vegetation from its surroundings and providing clearance for the chemical tape 400 which may also be simultaneously bent over the curb edge, as indicated at 420, if desired. The adhesive material 402 secures the tape in place and leaves it correctly located as indicated at 422. A brush 500 may be secured to frame 412 to clear the line of debris.

FIG. 4 will show that frame 412 may be provided with a suitable handle 14 by which it can be propelled and it will be understood that as with the chemicals which have been described in connection with the preceding figures, this structure provides a vegetation growth retarding strip or edge for the edge of lawn L or like area so that there is established and maintained a turf edge of substantial permanence.

It will, of course, be obvious that strip 400 may be composite, employ fibres and textiles or merely a chemical film and may have a substantial divergence in form and material while the turf groover, treating and mounting means may all be substantially modified without departure from the spirit of my invention of from the true scope of the appended claims.

What I claim is:

1. A terminating edger for lawns and like cultivated areas wherein a sharp line of demarcation is desirable, said device including in combination a guide adapted to follow the aforesaid line of demarcation, a cutter to free the same of vegetation and operating with and guided by said guide and a vegetation chemical control tape carried by and operating with said guide and cutter to apply said tape and thereby apply a prorated amount of said chemical evenly along the cut produced by said cutter in said vegetation.

2. The means for evenly and safely applying growth control chemical impregnated in string-like strip tapes to lawns to establish a path line therethrough which includes an impregnated strip of the character described carrying a color demarker chemical therein and an applicator capable of being guided along said path line to distribute said strip therealong.

3. The method of controlling the edge line only of turf plots which includes preparing a chemical line control and marking substance capable of restraining turf growth, applying said substance to a narrow strip of edging material, and then applying said strip with its carried chemical to the aforesaid edge line alone to define and establish the same.

4. The means of accomplishing the method of claim 3 which includes a flexible strip of material whereon has been placed a plant sterilant.

5. The means of accomplishing the method of claim 3 which includes a strip of material whereon has been placed a plant growth inhibitor.

6. The means of accomplishing the method of claim 3 which includes a strip of material whereon has been placed a plant herbicide.

7. A device for controlling vegetation growth at a lawn edge without affecting the lawn body which includes a carrier, guide means for propelling and directing said carrier along said edge, a tape roll mounting on said carrier and adapted to hold a quantity of chemical impregnated tape thereon, and a tape dispenser, also on said carrier, and operating therewith to direct said tape from said roll mounting to said lawn growth edge and in place therealong as such carrier moves thereover.

8. The method of controlling plant growth on predetermined division line through areas wherein such plant growths occur which comprises applying a narrow strip of material containing a plant growth control chemical along said division line and holding said narrow strip in place a sufficient length of time to permit said chemical to act on plants in said line responsive thereto.

9. The method of controlling the edge lines of herbaceous planted areas which comprises establishing an edge line of sharp demarcation for such area, defining the same and applying a narrow strip over said edge line, said strip carrying control chemical for maintaining the edge line of the planted area.

References Cited in the file of this patent

UNITED STATES PATENTS

| | | |
|---|---|---|
| 1,196,219 | Eckart | Aug. 29, 1916 |
| 1,550,082 | Lintz | Aug. 18, 1925 |
| 1,787,902 | Herfort | Jan. 6, 1931 |
| 1,882,377 | Whittelsey | Oct. 11, 1932 |
| 1,930,939 | Horner | Oct. 17, 1933 |
| 2,311,243 | Michael | Feb. 16, 1943 |
| 2,394,916 | Jones | Feb. 12, 1946 |
| 2,436,770 | Hill | Feb. 24, 1948 |
| 2,736,991 | Schumacher | Mar. 6, 1956 |

FOREIGN PATENTS

| | | |
|---|---|---|
| 550,337 | France | Dec. 11, 1922 |
| 907,739 | France | July 16, 1945 |
| 527,812 | Germany | June 22, 1931 |
| 142,074 | Switzerland | Nov. 1, 1930 |